(12) United States Patent
Chen et al.

(10) Patent No.: US 9,176,629 B2
(45) Date of Patent: Nov. 3, 2015

(54) PIXEL UNIT, METHOD FOR SENSING TOUCH OF AN OBJECT, AND DISPLAY APPARATUS INCORPORATING THE SAME

(75) Inventors: Chi-Wen Chen, Hsinchu (TW); Li-Wei Shih, Hsinchu (TW); Meng-Hsiang Chang, Hsinchu (TW); Chi-Mao Hung, Hsinchu (TW); Chien-Jen Chen, Hsinchu (TW); Kun-Hua Tsai, Hsinchu (TW)

(73) Assignee: AU OPTRONICS CORP., Hsinchu (TW)

( * ) Notice: Subject to any disclaimer, the term of this patent is extended or adjusted under 35 U.S.C. 154(b) by 1712 days.

(21) Appl. No.: 12/119,637

(22) Filed: May 13, 2008

(65) Prior Publication Data
US 2009/0058831 A1    Mar. 5, 2009

(30) Foreign Application Priority Data
Sep. 5, 2007    (TW) ................................ 96133109 A

(51) Int. Cl.
| | |
|---|---|
| G06F 3/045 | (2006.01) |
| G06F 3/044 | (2006.01) |
| G06F 3/041 | (2006.01) |
| G02F 1/1333 | (2006.01) |

(52) U.S. Cl.
CPC .............. G06F 3/044 (2013.01); G06F 3/0412 (2013.01); G02F 1/13338 (2013.01)

(58) Field of Classification Search
CPC .... G06F 3/044; G06F 3/0412; G02F 1/13338
USPC .......................................... 345/104, 156–184
See application file for complete search history.

(56) References Cited

U.S. PATENT DOCUMENTS

| | | | |
|---|---|---|---|
| 5,270,711 A | 12/1993 | Knapp | |
| 5,594,222 A | 1/1997 | Caldwell | |
| 5,940,064 A | 8/1999 | Kai et al. | |

(Continued)

FOREIGN PATENT DOCUMENTS

| | | |
|---|---|---|
| CN | 1916712 | 2/2007 |
| JP | 2000066837 A * | 3/2000 |

OTHER PUBLICATIONS

Taiwan Office Action mailed May 27, 2011.
(Continued)

*Primary Examiner* — Amare Mengistu
*Assistant Examiner* — Jennifer Zubajlo
(74) *Attorney, Agent, or Firm* — McClure, Qualey & Rodack, LLP

(57) ABSTRACT

A pixel unit, method for sensing touch of an object, and a display apparatus incorporating the same are provided. The display apparatus includes a data line. The pixel unit includes a first switch circuit electrically connected to the data line and a sensing circuit electrically connected to the first switch circuit. The sensing circuit generates a signal in response to the touch of the object, while the signal is transmitted through the data line with the first switch circuit turned on. In addition, the display apparatus further includes a readout line. The pixel unit further includes a second switch circuit electrically connected to the readout line. The sensing circuit is electrically connected to the second switch circuit. In a first time period, the sensing circuit receives a reference voltage via the first switch circuit. Then the signal generated by the touch of the object is transmitted through the readout line via the second switch circuit in a second time period.

29 Claims, 7 Drawing Sheets

(56) References Cited

U.S. PATENT DOCUMENTS

| | | | |
|---|---|---|---|
| 6,057,903 A * | 5/2000 | Colgan et al. | 349/139 |
| 7,379,054 B2 * | 5/2008 | Lee | 345/173 |
| 2005/0094038 A1 * | 5/2005 | Choi et al. | G06F 3/0412 349/12 |
| 2006/0017710 A1 * | 1/2006 | Lee et al. | G02F 1/13338 345/173 |
| 2007/0040814 A1 * | 2/2007 | Lee et al. | 345/173 |
| 2007/0262966 A1 | 11/2007 | Nishimura et al. | |
| 2008/0055267 A1 * | 3/2008 | Wu et al. | 345/173 |

OTHER PUBLICATIONS

English language translation of abstract and pertinent parts of CN 1916712.

* cited by examiner

PIXEL UNIT, METHOD FOR SENSING TOUCH OF AN OBJECT, AND DISPLAY APPARATUS INCORPORATING THE SAME

CROSS-REFERENCES TO RELATED APPLICATIONS

This application claims the benefit of priority based on Taiwan Patent Application No. 096133109, filed Sep. 5, 2007, the contents of which are incorporated herein by reference in their entirety.

BACKGROUND OF THE INVENTION

1. Field of the Invention

The present invention relates to a pixel unit, a method, and a display apparatus comprising the pixel unit. More particularly, the present invention relates to a pixel unit, a method for sensing touch of an object, and a display apparatus comprising the pixel unit.

2. Descriptions of the Related Art

The liquid crystal display (LCD), a full color display device using liquid crystal technology, has many advantages such as low power consumption, low emission, small volume, flexibility in size and a light weight. Therefore, LCD screens have found widespread use in products incorporating display screens, such as digital cameras, personal digital assistants (PDAs) and TV sets. To facilitate the operation of such electronic products incorporating an LCD screen, a touch control function may optionally be provided in a commercially available LCD screen depending on the requirements of the practical applications. The touch control function allows the LCD to read a touch input from a user. This kind of LCD screen is commonly known as a touch control LCD screen.

Generally, a variety of manufacturing methods exist for the commercially available touch control LCD screens. For example, in the capacitive touch control LCD screen, there are two manufacturing methods. The first is to obtain a touch control function by adding a sensing membrane on an LCD screen; while the other is to have a circuit for sensing the touch of an object formed directly into the LCD screen. FIG. 1 is a schematic diagram of a conventional LCD screen that can sense the touch of an object. The LCD screen 1 comprises a pixel unit 10, an output circuit 12 and a plurality of scan lines 14, 16. The pixel unit 10 further comprises a fixed capacitor 100, a liquid crystal capacitor 102, a variable capacitor 104, a pixel switch 106 and a readout switch 108. Once the pixel unit 10 is touched by an object (e.g., a touch pen, a finger or the like), a variation will occur in the capacitance of the variable capacitor 104, and an output current 101 will be generated in response thereto. The output current 101 is transmitted through the readout switch 108 to the output circuit 12, which then determines whether the pixel unit 10 has been touched according to the variation of the output current 101.

In the pixel unit of another conventional LCD screen capable of sensing the touch of an object, the pixel circuit is connected to the output circuit. The pixel unit comprises a fixed capacitor, a liquid crystal capacitor, a plurality of switches, a data line and an output line. The fixed capacitor and the liquid crystal capacitor are configured to receive a common voltage and are connected to these switches. One of these switches is configured to control whether the voltage transmitted by the data line is transmitted to the fixed capacitor and the liquid crystal capacitor. Another switch is configured to control whether the liquid crystal capacitor and the fixed capacitor are connected with the output circuit through the output line. The liquid crystal capacitor is a variable capacitor, the capacitance of which is determined by an equivalent liquid crystal dielectric constant and a distance between the two electrodes thereof. Once the pixel unit is touched by an object, the liquid crystal capacitor will have an increase in the capacitance and the amount of charges it stores will vary accordingly, thus resulting in an output current. In response to this, the output circuit may determine whether the pixel unit has been touched based on the variation of the output current. However, due to the impact of the connection structure described above, voltage transmitted by the data line typically experiences different variations as a function of the different grayscale level displayed by the pixel unit. Consequently, this unfixed voltage may affect the variation of the charge amount stored by the liquid crystal capacitor, thus making it difficult for the output circuit to determine whether the pixel unit has been touched.

According to aforementioned descriptions, the conventional capacitive touch control LCD screens all require additional elements in the original LCD screens. Since a sensing element and readout line have to be added into the pixel, the open ratio of the pixel unit tends to be decreased. However, the conventional pixel unit is susceptible to impact from the voltage input of the data line, which makes it difficult to determine whether the pixel has been touched. Therefore, efforts still have to be made in the art to provide a capacitive touch control LCD screen that can reduce the cost and improve the sensing ability without modifying the structure and circuit of the conventional pixel units.

SUMMARY OF THE INVENTION

One objective of this invention is to provide a pixel unit for use in a display apparatus with a data line. The pixel unit comprises a switch circuit and a sensing circuit. The switch circuit is electrically connected to the data line. The sensing circuit is electrically connected to the switch circuit for generating a signal in response to touch of an object, wherein the signal is transmitted through the data line with the switch circuit turned on.

Another objective of this invention is to provide a display apparatus, which comprises a data line, a driving circuit, and a pixel unit described above. The pixel unit is configured to receive pixel data transmitted by the driving circuit, and comprises a switch circuit and a sensing circuit for generating a signal in response to the touch of an object. The signal is transmitted through the data line with the switch circuit turned on.

Yet another objective of this invention is to provide a display apparatus for sensing the touch of an object, which comprises a plurality of data lines, a plurality of scan lines and a plurality of pixel units. Each of the pixel units comprises a switch circuit and a variable capacitor electrically connected to the switch circuit. The variable capacitors of the pixel units are configured to generate a plurality of signals in response to the touch of the object, and the scan lines are electrically connected to the pixel units to turn on the switch circuits of the pixel units in sequence. The signals are transmitted through the data lines by turning on the switch circuits of the pixel units in sequence.

Yet a further objective of this invention is to provide a method for use in a pixel unit to sense the touch of an object. The pixel unit comprises a first switch circuit, a second switch circuit and a variable capacitor. The method comprises the following steps: turning on the first switch circuit in a first time period and inputting a reference voltage from a data line through the first switch circuit; generating a signal in response to the touch of the object according to the reference voltage; and turning on the second switch circuit in a second time period and transmitting the signal through a readout line via the second switch circuit.

Yet another objective of this invention is to provide a pixel unit for use in a display apparatus to sense the touch of an object. The display apparatus comprises a data line and a readout line. The pixel unit comprises the following: a first switch circuit electrically connected to the data line; a second switch circuit electrically connected to the readout line; and a variable capacitor electrically connected to the first switch circuit and the second switch circuit. The variable capacitor receives a reference voltage from the data line through the first switch circuit in a first time period and generates a signal in response to the touch of the object according to the reference voltage. The signal is transmitted through the readout line via the second switch circuit in a second time period.

Yet another objective of this invention is to provide a display apparatus, which comprises a data line, a driving circuit, a readout line, and a pixel unit for sensing touch of an object described above. The pixel unit is configured to receive pixel data transmitted by the driving circuit, and comprises the following: a first switch circuit electrically connected to the data line; a second switch circuit electrically connected to the readout line; and a variable capacitor electrically connected to the first switch circuit and the second switch circuit. The variable capacitor receives a reference voltage from a data line through the first switch circuit in a first time period and generates a signal in response to the touch of the object according to the reference voltage. The signal is transmitted through the readout line via the second switch circuit in a second time period.

In the pixel unit of this invention, the signal generated by the sensing circuit is transmitted from the data line through the switch circuit, thus saving the expense and space consumed by the output circuit. Additionally, by inputting a reference voltage to a variable capacitor through a data line, the capability of the pixel unit to sense touch of an object may be enhanced. Therefore, by using this invention, the additional output circuit required in a conventional pixel unit for sensing touch of an object, as well as the impact of the input voltage on the data line are not needed, which makes it easier to determine whether the pixel has been touched.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
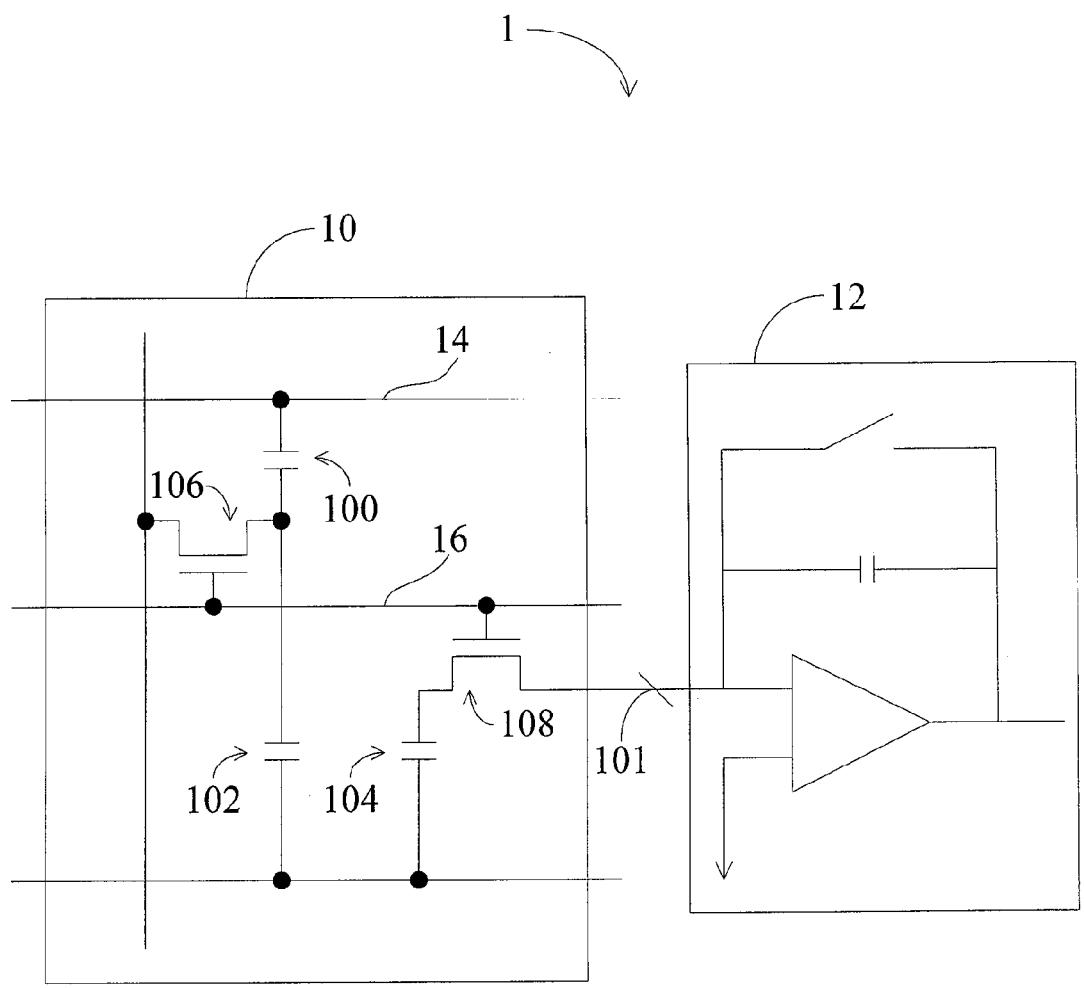
FIG. 1 is a schematic diagram of a conventional LCD screen for sensing the touch of an object.
Figure 2:
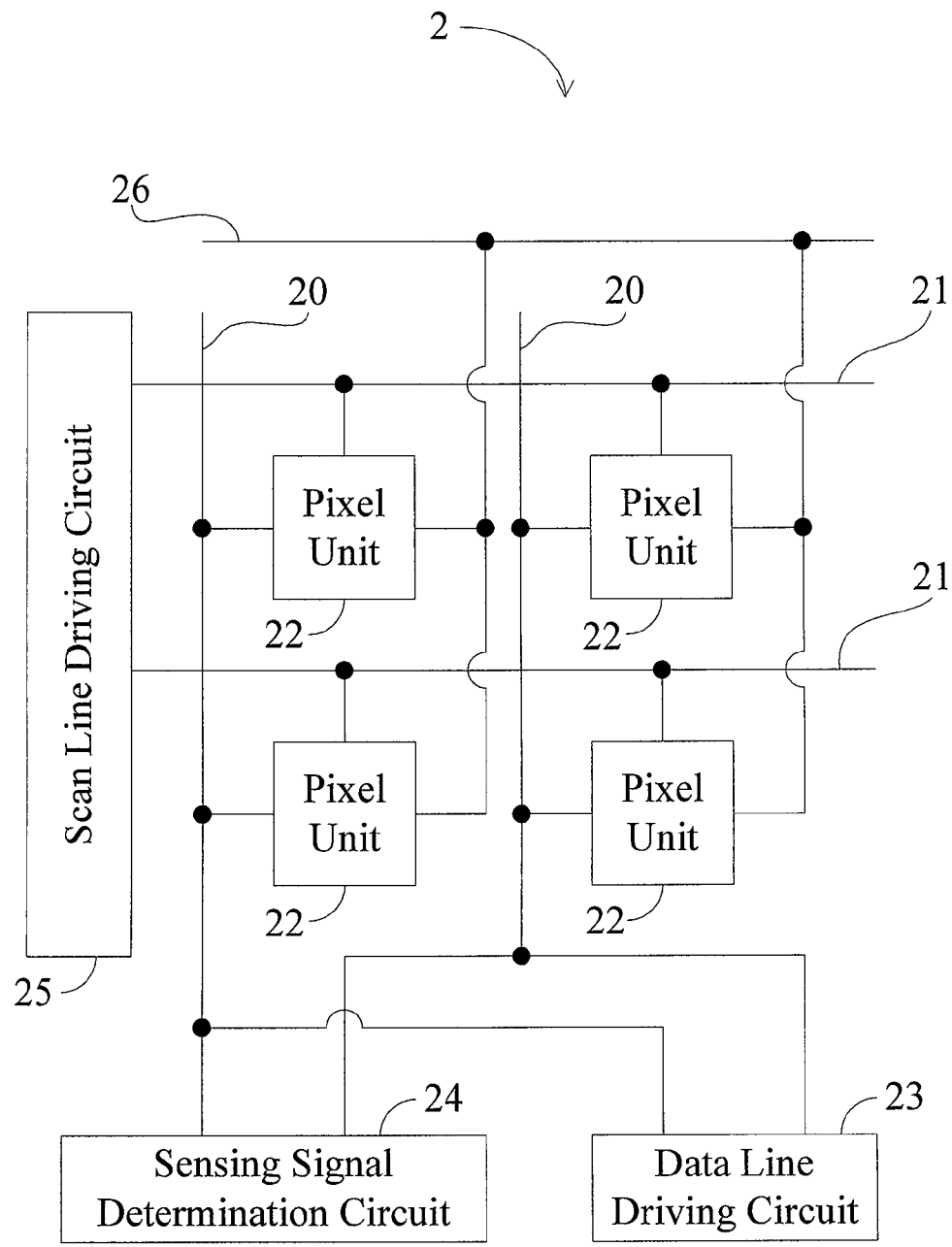
FIG. 2 is a schematic diagram according to a first embodiment of the present invention.

As shown in FIG. 2, a first embodiment of the present invention is directed to a display apparatus with a touch screen function. The display apparatus 2 comprises a plurality of data lines 20, a plurality of scan lines 21, a plurality of pixel units 22, a data line driving circuit 23, a sensing signal determination circuit 24, a scan line driving circuit 25 and a common power supply line 26. Each of the scan lines 21 are electrically connected with the pixel units 22 in sequence, and are driven by the scan line driving circuit 25 to turn on the pixel units 22 in sequence. The pixel units 22 are configured to receive pixel data transmitted by the data line driving circuit 23, and display an image according to the pixel data. When turned on, the pixel units 22 transmit the signals generated in response to the touch of an object through the data lines 20 in sequence. The sensing signal determination circuit 24 is electrically connected to the data lines 20 and is configured to receive the signals generated by the pixel units 22 in response to the touch of an object. The sensing signal determination circuit 24 may be a comparator, an integrator, or a combination thereof, which may be implemented by those skilled in the art using a well-known technology.

Figure 3:
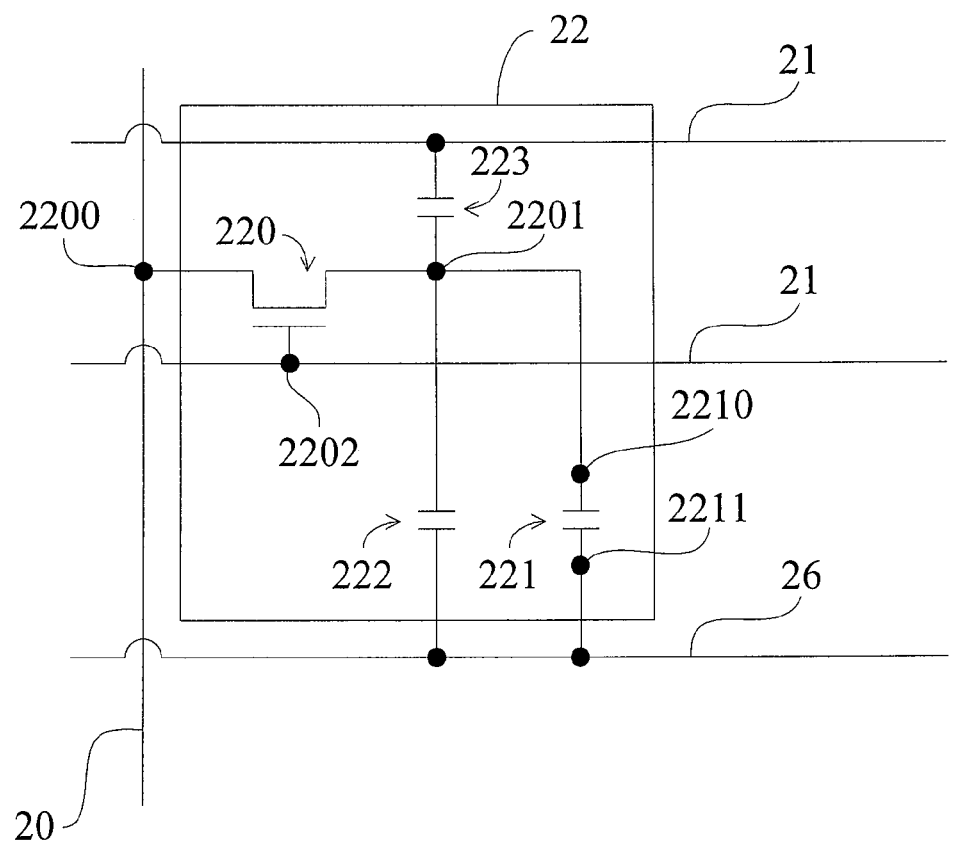
FIG. 3 is a circuit diagram of a pixel unit according to the first embodiment of the present invention.

FIG. 3 illustrates one implementation of the pixel unit. Particularly, each of the pixel units 22 comprises a switch circuit (i.e., a transistor 220) and a sensing circuit (i.e., a variable capacitor 221). The transistor 220 is electrically connected to the data line 20. The variable capacitor 221 is electrically connected to the transistor 220 and generates an output current in response to the touch of an object. Then, with the transistor 220 turned on, the output current is transmitted to the sensing signal determination circuit 24 through the data line 20.

The transistor 220 comprises a first electrode (i.e., a source or a drain) 2200 and a second electrode (a drain or a source opposite to the first electrode 2200) 2201. The first electrode 2200 of the transistor 220 is electrically connected with the data line 20 to transmit the output current generated in response to the touch of an object to the data line 20. The second electrode 2201 of the transistor 220 is electrically connected to the variable capacitor 221 to receive the output current generated by the variable capacitor 221 in response to the touch of an object. The transistor 220 has a gate 2202, which is electrically connected with the scan line 21 to control whether to turn on the transistor 220. Specifically, the scan line 21 is configured to control the gate 2202, which thereby controls the "on" status of the transistor 220. When the transistor 220 is turned on, the pixel data transmitted by the data line driving circuit 23 can be input into the pixel unit 22 through the transistor 220, while the output current generated in response to the touch of an object can also be sent out to the data line 20 through the transistor 220 and further transmitted to the sensing signal determination circuit 24. In this embodiment, the transistor 220 may be either an N-type or a P-type transistor.

Once an object touches a pixel unit 22, the variable capacitor 221 of the touched pixel unit 22 will experiences a change in capacitance, thus generating an output current in response to the touch of the object. Particularly, the variable capacitor 221 comprises a first electrode 2210 and a second electrode 2211. The first electrode 2210 of the variable capacitor 221 is electrically connected to the transistor 220 to transmit the output current, generated in response to the touch of the object, to the transistor 220. The second electrode 2211 is electrically connected to the common power supply line 26 which provides a reference value for the variable capacitor 221 to generate the output current (i.e., supplying a voltage to the variable capacitor 221).

The pixel unit 22 further comprises a liquid crystal capacitor 222 and a fixed capacitor 223, the operation of which is well-known by those of ordinary skill in the art and will not be described in detail herein.

Figure 4:
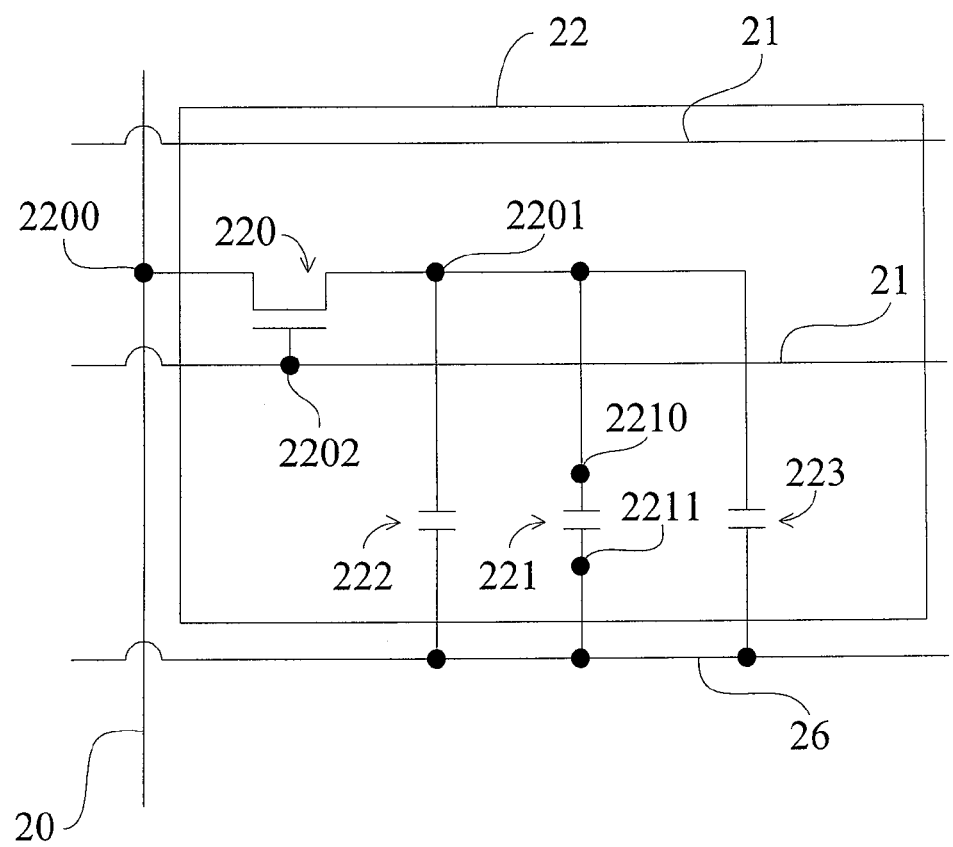
FIG. 4 is a circuit diagram of another pixel unit according to the first embodiment of the present invention.

The pixel unit 22 of the display apparatus 2 may be replaced by another implementation of the pixel unit 22 shown in FIG. 4. The pixel unit 22 shown in FIG. 4 differs from that shown in FIG. 3 in that the fixed capacitor 223 of the pixel unit 22 in FIG. 3 is electrically connected with the scan line 21, while the fixed capacitor 223 of the pixel unit 22 in FIG. 4 is electrically connected with the common power supply line 26. The operation and principle of the pixel unit 22 in FIG. 4 are just the same as those of the pixel unit 22 in FIG. 3, and therefore will not be described in detail again.

With the aforementioned configurations in the first embodiment of the present invention, the sensing circuit of the pixel unit generates a signal (i.e., an output current) in response to the touch of an object. The signal is outputted through the data line to the sensing signal determination circuit, which then determines whether the pixel unit has been touched. In this way, the display apparatus of the present invention is provided with a touch screen function.

Figure 5:
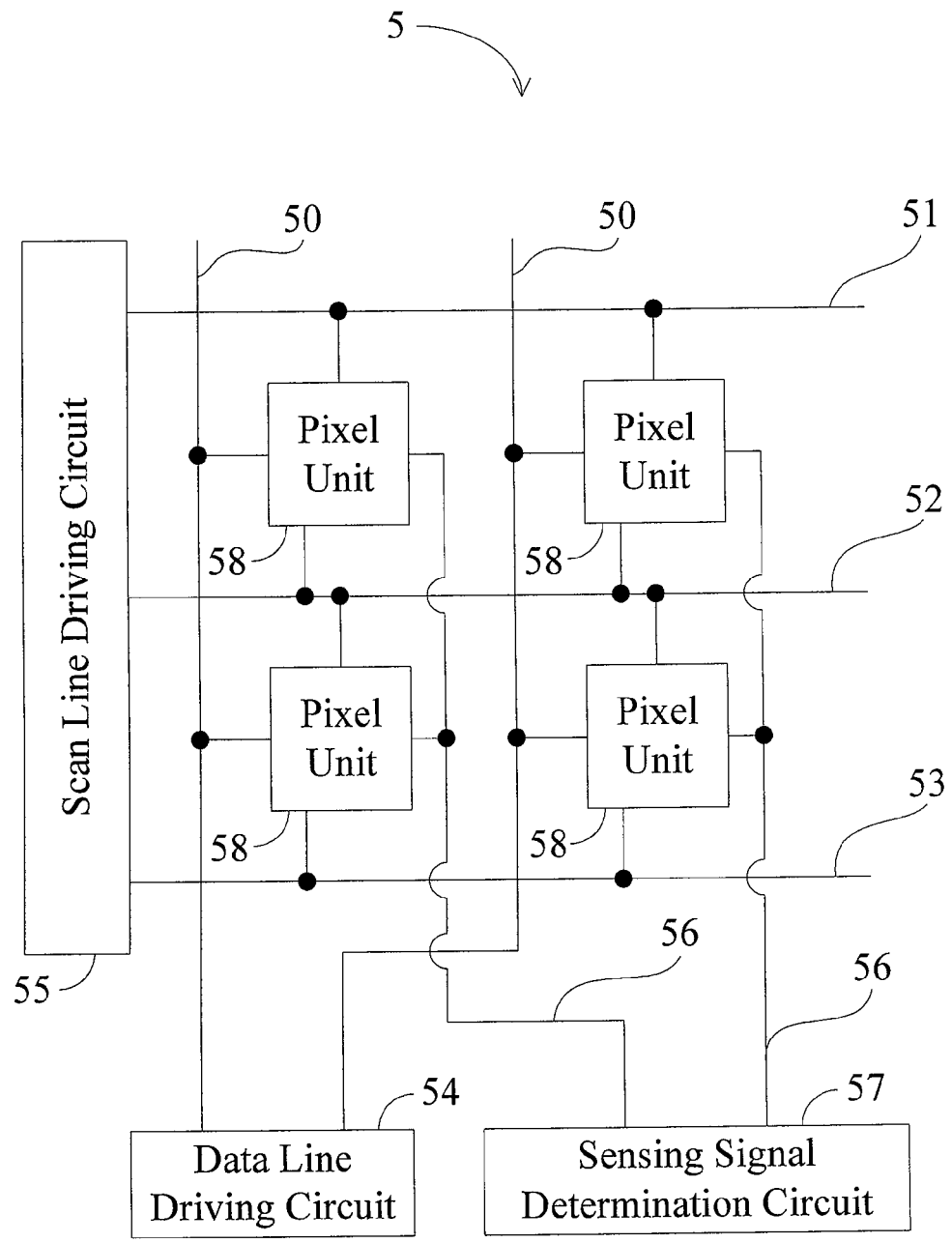
FIG. 5 is a circuit diagram according to a second embodiment of the present invention.

Another display apparatus 5 with a touch screen function in the second embodiment of the present invention is shown in FIG. 5. The display apparatus 5 comprises a plurality of data lines 50, a plurality of scan lines 51, 52, 53, a data line driving circuit 54, a scan line driving circuit 55, a plurality of readout lines 56, a sensing signal determination circuit 57 and a plurality of pixel units 58. The scan lines 51, 52, 53 are electrically connected with each of the pixel units 58 in sequence, and are driven by the scan line driving circuit 55 to turn on the pixel units 58 in sequence. The pixel units 58 are configured to receive the pixel data transmitted by the data line driving circuit 54, and display an image according to the pixel data.

Figure 6:
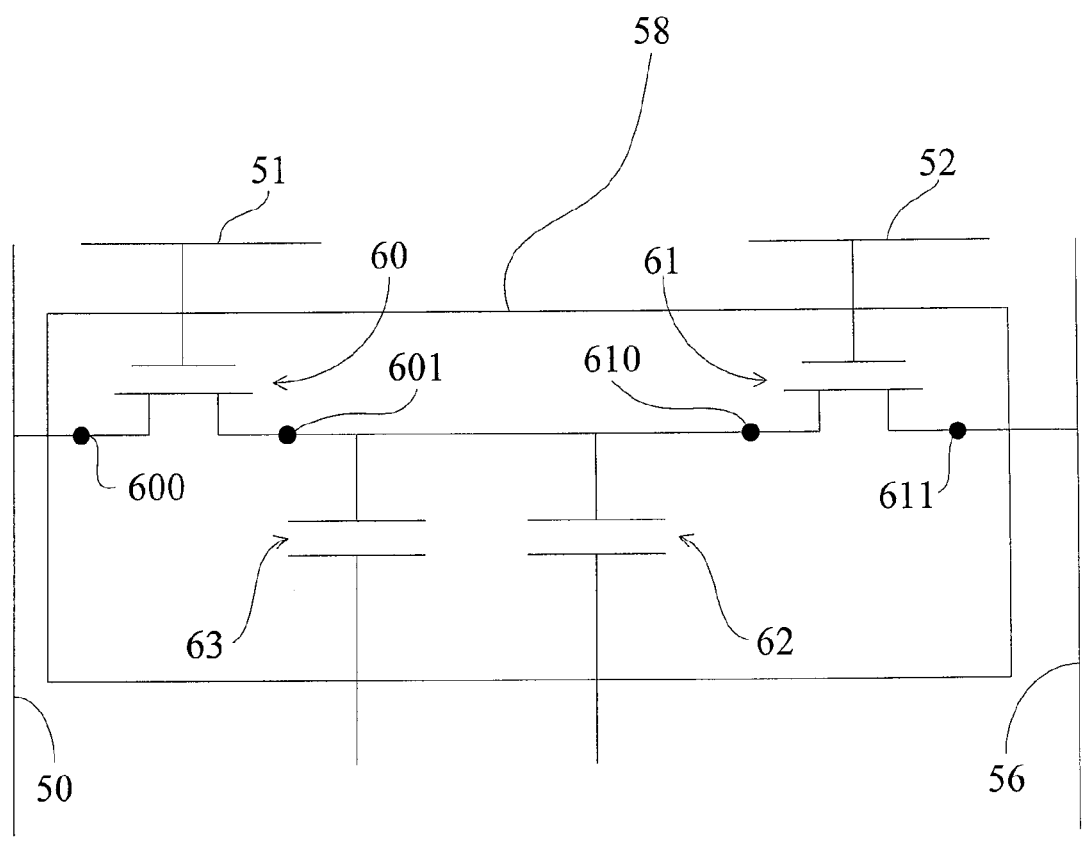
FIG. 6 is a circuit diagram of a pixel unit according to the second embodiment of the present invention.

As shown in FIG. 6, one implementation of the pixel unit 58 comprises a first switch circuit (i.e., a first transistor 60), a second switch circuit (i.e., a second transistor 61), a variable capacitor 62 and a fixed capacitor 63. The first transistor 60 and the second transistor 61 are electrically connected to the different scan lines respectively. For example, the first transistor 60 is electrically connected to the scan line 51, while the second transistor 61 is electrically connected to the scan line 52. As the first transistor 60 and the second transistor 61 are electrically connected to different scan lines, the time to turn on the first transistor 60 and the second transistor 61 are also different. In the first time period of the scan line 51, the first transistor 60 will be turned on so that the variable capacitor 62 receives a reference voltage from the data line 50 through the first transistor 60.

In response to the touch of an object, the variable capacitor 62 may generate an output current according to the reference voltage. Subsequently, in the second time period of the scan line 52, the second transistor 61 will be turned on so that the output current generated by the variable capacitor 62 can be outputted through the second transistor 61 to the readout line 56. Specifically, the first time period may range from 0 seconds to 1 second, during which the scan line is turned on. The second time period may range from 1 second to 2 seconds, during which the scan line 52 is turned on. With the different turn-on time periods, the first transistor 60 and the second transistor 61 will be turned on at different times. As a result, there is a time offset between the input of the reference voltage into the variable capacitor 62 and the transmission of the output current via the readout line 56, i.e., the transmission of the reference voltage and transmission of the signal occur in different time periods, which may adequately mitigate the difficulty in determining whether the pixel has been touched due to impact of the voltage input from the data line. The reference voltage may be the maximum voltage among all signals of the display apparatus 5.

The first transistor 60 has a first electrode (i.e., a source or a drain) 600 and a second electrode (a drain or a source opposite to the first electrode 600) 601. The first electrode 600 of the first transistor 60 is electrically connected to the data line 50 to receive the reference voltage. The second electrode 601 of the first transistor 60 is electrically connected to the variable capacitor 62 to transmit the reference voltage to the variable capacitor 62. The second transistor 61 has a first electrode (i.e., a source or a drain) 610 and a second electrode (a drain or a source opposite to the first electrode 610) 611. The first electrode 610 of the second transistor 61 is electrically connected to the variable capacitor 62 to receive the output current generated by the variable capacitor 62 in response to the touch of the object. The second electrode 611 of the second transistor 61 is electrically connected to the readout line 56, so that the output current can be transmitted via the readout line 56.

With the aforementioned configurations of the second embodiment of the present invention, the reference voltage is inputted from the data line to improve the accuracy and sensitivity of determining whether the pixel unit has been touched.

Figure 7:
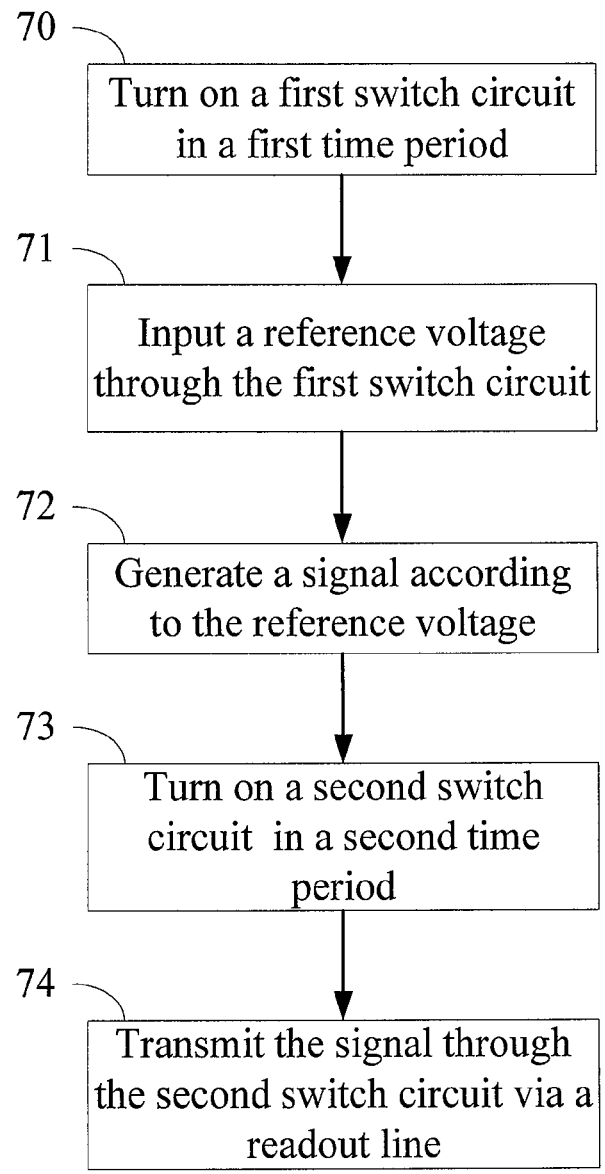
FIG. 7 is a flow chart according to a third embodiment of the present invention.

A method of sensing the touch of an object of the third embodiment of this invention is shown in FIG. 7. This method is applied to the pixel unit 58 described in the second embodiment, and is described as follows.

This method begins with step 70, where a first switch circuit is turned on in a first time period. Then, in step 71, a reference voltage is inputted from a data line through the first switch circuit. Next, in step 72, in response to the touch of an object, a signal is generated according to the reference voltage. The second switch circuit is then turned on in a second time period in step 73. Finally in step 74, the signal is transmitted through the second switch circuit via a readout line.

In addition to the steps shown in FIG. 7, all the operations and functions of the second embodiment may also be implemented in the third embodiment. Those of ordinary skill in the art will appreciate how to implement these operations and functions based on the second embodiment, so this will not be described in detail herein again.

According to the aforementioned descriptions, by outputting the signal generated by the sensing circuit, in response to the touch of an object, to a sensing signal determination circuit directly through a data line, this invention does not require an additional output circuit in the conventional pixel unit. Furthermore, by inputting a reference voltage via a data line, this invention can improve the accuracy and sensitivity of determining whether the pixel unit has been touched, thus mitigating the difficulty in determining whether the pixel has been touched due to the impact of other input voltages.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A pixel unit for use in a display apparatus with a data line, comprising:
   a liquid crystal capacitor;
   a fixed capacitor;
   a switch circuit electrically connected to the data line; and
   a sensing circuit, electrically connected to the switch circuit, having a variable capacitor electrically connected to the data line via the switch circuit, a capacitance of the variable capacitor being changed in response to a touch of an object, the variable capacitor generating a signal in response to the change of the capacitance thereof;
   wherein the signal comprising an output current generated in response to the touch of the object is transmitted through the data line with the switch circuit being turned on.

2. The pixel unit of claim 1, wherein the switch circuit comprises a transistor having:
   a first electrode, electrically connected to the data line, for transmitting the signal to the data line; and
   a second electrode, electrically connected to the sensing circuit, for receiving the signal.

3. The pixel unit of claim 2, wherein the display apparatus comprises a scan line, and the transistor further has a gate, electrically connected to the scan line, for controlling whether to turn on the transistor.

4. The pixel unit of claim 1, wherein the variable capacitor has:
   a first electrode, electrically connected to the switch circuit, for transmitting the signal to the switch circuit; and
   a second electrode electrically connected to a power source, wherein the power source is a reference value for the variable capacitor to generate the signal.

5. A display apparatus, comprising:
   a data line;
   a driving circuit; and
   a pixel unit for receiving pixel data transmitted by the driving circuit, comprising:
      a liquid crystal capacitor;
      a fixed capacitor;
      a switch circuit electrically connected to the data line; and
      a sensing circuit, electrically connected to the switch circuit, having a variable capacitor electrically connected to the data line via the switch circuit, a capacitance of the variable capacitor being changed in response to a touch of an object, the variable capacitor generating a signal in response to the capacitance thereof;
   wherein the signal comprising an output current generated in response to the touch of the object is transmitted through the data line with the switch circuit being turned on.

6. The display apparatus of claim 5, wherein the switch circuit comprises a transistor having:
   a first electrode, electrically connected to the data line, for transmitting the signal to the data line; and
   a second electrode, electrically connected to the sensing circuit, for receiving the signal.

7. The display apparatus of claim 6, wherein the display apparatus comprises a scan line, and the transistor further has a gate, electrically connected to the scan line, for controlling whether to turn on the transistor.

8. The display apparatus of claim 6, further comprising a sensing signal determination circuit, electrically connected to the data line, for receiving the signal from the data line.

9. The display apparatus of claim 8, wherein the sensing signal determination circuit comprises a comparator.

10. The display apparatus of claim 8, wherein the sensing signal determination circuit comprises an integrator.

11. The display apparatus of claim 8, further comprising a control unit, electrically connected to the sensing signal determination circuit and the driving circuit, for controlling transmission of the signal and the pixel data.

12. The display apparatus of claim 5, wherein the variable capacitor has:
   a first electrode, electrically connected to the switch circuit, for transmitting the signal to the switch circuit; and
   a second electrode electrically connected to a power source, wherein the power source is a reference value for the variable capacitor to generate the signal.

13. A display apparatus for sensing touch of an object, comprising:
   a plurality of data lines;
   a plurality of scan lines; and
   a plurality of pixel units, each of the pixel units comprising a liquid crystal capacitor, a fixed capacitor and a variable capacitor electrically connected to a switch circuit and electrically connected to one of the data lines via the switch circuit;
   wherein the variable capacitors of the pixel units generate a plurality of signals in response to the touch of the object, the scan lines are orderly electrically connected to the pixel units to orderly turn on the switch circuits of the pixel units, and the signals comprising output currents generated in response to the touch of the object are transmitted through the data lines by orderly turning on the switch circuits of the pixel units.

14. The display apparatus of claim 13, further comprising a plurality of sensing signal determination circuits, orderly electrically connected to the data lines, for receiving the signals from the data lines respectively.

15. The display apparatus of claim 14, wherein each of the sensing signal determination circuits comprises a comparator.

16. The display apparatus of claim 14, wherein each of the sensing signal determination circuits comprises an integrator.

17. The display apparatus of claim 13, wherein the switch circuit is a transistor, and a gate of the transistor is electrically connected to one of the scan lines.

18. A method for sensing touch of an object on a pixel unit of a display apparatus, the display apparatus having a data line and a switch circuit, the pixel unit comprising a liquid crystal capacitor, a fixed capacitor and a variable capacitor electrically connected to the switch circuit and electrically connected to the data line via the switch circuit, the method comprising the following steps of:
   generating a signal, by the variable capacitor, in response to a touch of the object; and
   transmitting the signal comprising an output current generated in response to the touch of the object through the data line when the switch circuit is turned on.

19. A method for sensing touch of an object on a pixel unit, the pixel unit comprising a first switch circuit, a second switch circuit, a fixed capacitor, a liquid crystal capacitor, and a variable capacitor electrically connected to the first switch circuit and the second switch circuit and electrically connected to a data line via the first switch circuit, the method comprising the following steps of:
   turning on the first switch circuit in a first time period and inputting a reference voltage through the data line by the first switch circuit into the variable capacitor;

generating a signal, by the variable capacitor, in response to a touch of the object according to the reference voltage; and turning on the second switch circuit in a second time period and transmitting the signal through a readout line by the second switch circuit.

20. The method of claim 19, wherein the reference voltage is a maximum voltage of all signals in the pixel unit.

21. A pixel unit for use in a display apparatus for sensing touch of an object, the display apparatus comprising a data line and a readout line, the pixel unit comprising:
    a first switch circuit electrically connected to the data line;
    a second switch circuit electrically connected to the readout line;
    a fixed capacitor;
    a liquid crystal capacitor; and
    a variable capacitor electrically connected to the first switch circuit and the second switch circuit and electrically connected the data line via the first switch circuit;
    wherein the variable capacitor receives a reference voltage from the data line by the first switch circuit in a first time period and generates a signal in response to the touch of the object according to the reference voltage, and the signal is transmitted through the readout line by the second switch circuit in a second time period.

22. The pixel unit of claim 21, wherein the reference voltage is a maximum voltage of all signals in the pixel unit.

23. The pixel unit of claim 21, wherein the first switch circuit is a transistor having:
    a first electrode, electrically connected to the data line, for receiving the reference voltage; and
    a second electrode, electrically connected to the variable capacitor, for transmitting the reference voltage to the variable capacitor.

24. The pixel unit of claim 21, wherein the second switch circuit is a transistor having:
    a first electrode, electrically connected to the variable capacitor, for receiving the signal; and
    a second electrode, electrically connected to the readout line, for transmitting the signal through the readout line.

25. The pixel unit of claim 21, wherein the display apparatus includes a touch screen function.

26. A display apparatus, comprising:
    a data line;
    a driving circuit;
    a readout line; and
    a pixel unit for receiving pixel data transmitted by the driving circuit, comprising:
        a first switch circuit electrically connected to the data line;
        a second switch circuit electrically connected to the readout line;
        a fixed capacitor;
        a liquid crystal capacitor; and
        a variable capacitor electrically connected to the first switch circuit and the second switch circuit and electrically connected to the data line via the first switch circuit;
    wherein the variable capacitor receives a reference voltage from the data line by the first switch circuit in a first time period and generates a signal in response to a touch of an object according to the reference voltage, and the signal is transmitted through the readout line by the second switch circuit in a second time period.

27. The display apparatus of claim 26, wherein the reference voltage is a maximum voltage of all signals in the pixel unit.

28. The display apparatus of claim 26, wherein the first switch circuit is a transistor having:
    a first electrode, electrically connected to the data line, for receiving the reference voltage; and
    a second electrode, electrically connected to the variable capacitor, for transmitting the reference voltage to the variable capacitor.

29. The display apparatus of claim 26, wherein the second switch circuit is a transistor having:
    a first electrode, electrically connected to the variable capacitor, for receiving the signal; and
    a second electrode, electrically connected to the readout line, for transmitting the signal through the readout line.

* * * * *